US012752278B2

(12) United States Patent
Quarmby et al.

(10) Patent No.: US 12,752,278 B2
(45) Date of Patent: Oct. 6, 2026

(54) PREVENTING DRY SYRINGES

(71) Applicant: Thermo Finnigan LLC, San Jose, CA (US)

(72) Inventors: Scott T. Quarmby, Round Rock, TX (US); Xin Zheng, Austin, TX (US); Charles Vogt, Austin, TX (US)

(73) Assignee: Thermo Finnigan LLC, San Jose, CA (US)

( * ) Notice: Subject to any disclaimer, the term of this patent is extended or adjusted under 35 U.S.C. 154(b) by 831 days.

(21) Appl. No.: 18/050,583

(22) Filed: Oct. 28, 2022

(65) Prior Publication Data

US 2024/0139750 A1 May 2, 2024

(51) Int. Cl.
*B01L 3/02* (2006.01)

(52) U.S. Cl.
CPC .................................... *B01L 13/02* (2019.08)

(58) Field of Classification Search
None
See application file for complete search history.

(56) References Cited

U.S. PATENT DOCUMENTS

| | | | | |
|---|---|---|---|---|
| 9,176,156 | B2 * | 11/2015 | Azuma | G01N 35/1004 |
| 9,897,519 | B2 * | 2/2018 | Suzuki | G01N 35/00584 |
| 2016/0193622 | A1 * | 7/2016 | Miyakawa | B05B 12/12 134/22.12 |
| 2016/0282377 | A1 * | 9/2016 | Nagai | G01N 21/31 |
| 2018/0161829 | A1 * | 6/2018 | Horie | G01N 35/1002 |
| 2019/0271713 | A1 * | 9/2019 | Heinemann | G01N 35/00623 |
| 2020/0110063 | A1 * | 4/2020 | Fukushima | G01N 30/24 |
| 2024/0201218 | A1 * | 6/2024 | Ito | G01N 35/1004 |

OTHER PUBLICATIONS

"Simplifying Sample Introduction" Agilent Brochure for Webinar, May 10, 2018, 52 pages.
"Syringes for the laboratory" Trajan Brochure, Mar. 2022, 44 pages.
'Troubleshooting GC Syringe Issues' Restek web article, Nov. 1, 2022, 3 pages.

* cited by examiner

*Primary Examiner* — Brian R Gordon

(57) ABSTRACT

Disclosed herein are scientific instrument support systems, as well as related methods, computing devices, and computer-readable media. For example, in some embodiments, a scientific instrument support apparatus, includes timing logic to determine a maximum time without wetting for a syringe; and rinsing logic to control an autosampler to rinse the syringe when the maximum time without wetting is reached.

9 Claims, 11 Drawing Sheets

PREVENTING DRY SYRINGES

BACKGROUND

Scientific instruments may include a complex arrangement of movable components, sensors, input and output ports, energy sources, and consumable components. Failures or changes in any part of this arrangement may result in a "downed" instrument, one that is not able to perform its intended function.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, not by way of limitation, in the figures of the accompanying drawings.

DETAILED DESCRIPTION

Figure 1:
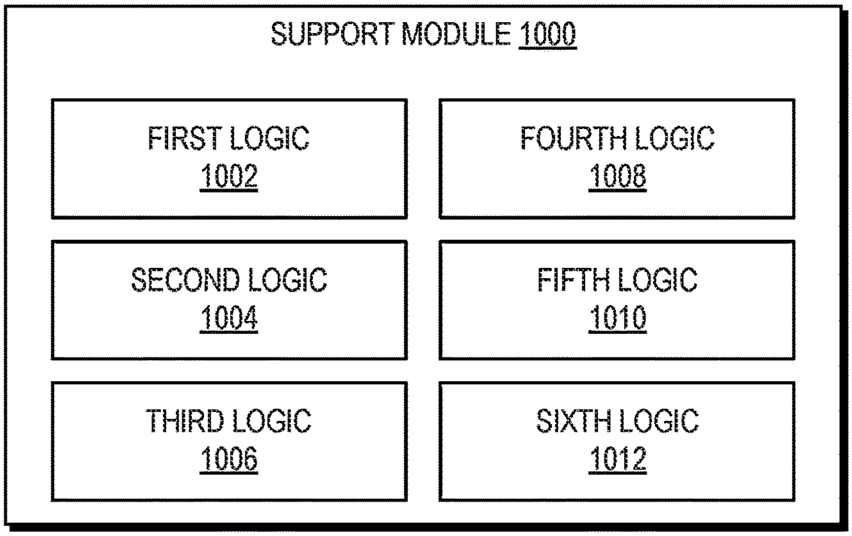
FIG. 1 is a block diagram of an example scientific instrument support module for performing support operations, in accordance with various embodiments.

Disclosed herein are scientific instrument support systems, as well as related methods, computing devices, and computer-readable media. For example, in some embodiments, a scientific instrument support apparatus includes timing logic to determine a maximum time without wetting for a syringe; and rinsing logic to control an autosampler to rinse the syringe when the maximum time without wetting is reached.

The embodiments disclosed herein may achieve improved syringe life relative to conventional approaches. For example, conventional approaches may result in abrasion of the inside of the syringe, stuck syringes from retained compounds, and general wear on the syringe.

Various ones of the embodiments disclosed herein may improve upon conventional approaches to achieve the technical advantages of maintaining the operation of the syringe and thus the scientific instrument by ensuring the plunger remains wet and the syringe in maintained in a clean state. All users of systems including such embodiments may benefit from these advantages (e.g., by assisting the user in the performance of a technical task, such as select wash solutions, by means of a guided human-machine interaction process). The technical features of the embodiments disclosed herein are thus decidedly unconventional in the field of gas chromatography, as are the combinations of the features of the embodiments disclosed herein. The computational and user interface features disclosed herein do not only involve the collection and comparison of information, but apply new analytical and technical techniques to change the operation of the gas chromatograph system including the autosampler. The present disclosure thus introduces functionality that neither a conventional computing device, nor a human, could perform.

In the following detailed description, reference is made to the accompanying drawings that form a part hereof wherein like numerals designate like parts throughout, and in which is shown, by way of illustration, embodiments that may be practiced. It is to be understood that other embodiments may be utilized, and structural or logical changes may be made, without departing from the scope of the present disclosure. Therefore, the following detailed description is not to be taken in a limiting sense.

Various operations may be described as multiple discrete actions or operations in turn, in a manner that is most helpful in understanding the subject matter disclosed herein. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

For the purposes of the present disclosure, the phrases "A and/or B" and "A or B" mean (A), (B), or (A and B). For the purposes of the present disclosure, the phrases "A, B, and/or C" and "A, B, or C" mean (A), (B), (C), (A and B), (A and C), (B and C), or (A, B, and C). Although some elements may be referred to in the singular (e.g., "a processing device"), any appropriate elements may be represented by multiple instances of that element, and vice versa. For example, a set of operations described as performed by a processing device may be implemented with different ones of the operations performed by different processing devices.

The description uses the phrases "an embodiment," "various embodiments," and "some embodiments," each of which may refer to one or more of the same or different embodiments. Furthermore, the terms "comprising," "including," "having," and the like, as used with respect to embodiments of the present disclosure, are synonymous. When used to describe a range of dimensions, the phrase "between X and Y" represents a range that includes X and Y. As used herein, an "apparatus" may refer to any individual device, collection of devices, part of a device, or collections of parts of devices. The drawings are not necessarily to scale.

Liquid autosampler syringe manufacturers instruct users to keep the plunger wet to avoid damage. Some of the common GC solvents are very volatile (e.g. methylene chloride boiling point 40° C., pentane boiling point 36° C.).

A syringe used with these solvents can dry out even before the next injection. Moving a dry plunger causes mechanical abrasion damage. In addition, once the solvent dries out, residual sample in the syringe may "glue" the plunger to the barrel. Metabolomics samples, for example, often have these sticky residues despite being rinsed with multiple solvents.

After each injection, the syringe is rinsed to remove as much of the residual sample as possible. This often involves volatile solvents. The syringe can then be rinsed with a less volatile solvent (e.g. iso-octane boiling point 99° C., toluene boiling point 111° C.) which evaporates much less quickly.

FIG. 1 is a block diagram of a scientific instrument support module 1000 for performing support operations, in accordance with various embodiments. The scientific instrument support module 1000 may be implemented by circuitry (e.g., including electrical and/or optical components), such as a programmed computing device. The logic of the scientific instrument support module 1000 may be included in a single computing device, or may be distributed across multiple computing devices that are in communication with each other as appropriate. Examples of computing devices that may, singly or in combination, implement the scientific instrument support module 1000 are discussed herein with reference to the computing device 4000 of FIG. 4, and examples of systems of interconnected computing devices, in which the scientific instrument support module 1000 may be implemented across one or more of the computing devices, is discussed herein with reference to the scientific instrument support system 5000 of FIG. 5.

The scientific instrument support module 1000 may include first logic 1002, second logic 1004, and third logic 1006, fourth logic 1008, fifth logic 1010, and sixth logic 1012. As used herein, the term "logic" may include an apparatus that is to perform a set of operations associated with the logic. For example, any of the logic elements included in the support module 1000 may be implemented by one or more computing devices programmed with instructions to cause one or more processing devices of the computing devices to perform the associated set of operations. In a particular embodiment, a logic element may include one or more non-transitory computer-readable media having instructions thereon that, when executed by one or more processing devices of one or more computing devices, cause the one or more computing devices to perform the associated set of operations. As used herein, the term "module" may refer to a collection of one or more logic elements that, together, perform a function associated with the module. Different ones of the logic elements in a module may take the same form or may take different forms. For example, some logic in a module may be implemented by a programmed general-purpose processing device, while other logic in a module may be implemented by an application-specific integrated circuit (ASIC). In another example, different ones of the logic elements in a module may be associated with different sets of instructions executed by one or more processing devices. A module may not include all of the logic elements depicted in the associated drawing; for example, a module may include a subset of the logic elements depicted in the associated drawing when that module is to perform a subset of the operations discussed herein with reference to that module.

In various embodiments, one or more of the logic elements described herein (including timing logic, rinsing logic, force logic, solvent logic, removal logic, and install logic) may be implemented by a common processing device executing instructions stored in a storage device. The processing device may be integrated into a scientific instrument housing, including within an autosampler. The storage device may include non-transitory computer-readable media storing instructions that, when executed by the processing device, cause the processing device to perform the associated operations described for the respective logic elements.

Figure 6:
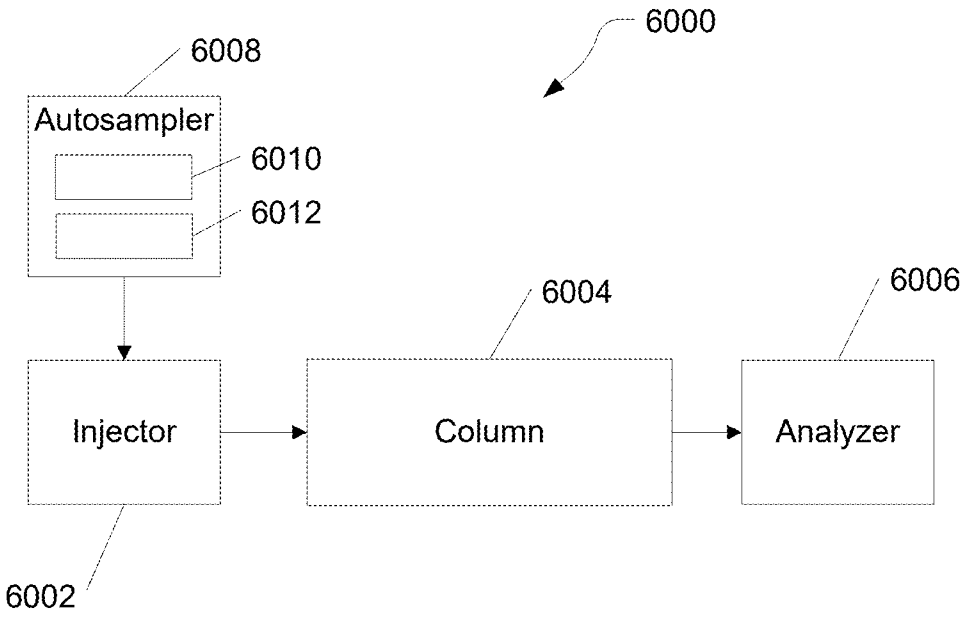
FIG. 6 is a diagram of an exemplary gas chromatography system.

In some embodiments, determining an amount of solvent remaining in a solvent bottle may be performed using a solvent-level sensor, such as 6010 of FIG. 6, configured to detect a volume or level of solvent in the solvent bottle. In some embodiments, monitoring force when moving a plunger may be performed using a plunger-force sensor, such as 6012 of FIG. 6, configured to generate signals indicative of force applied to the plunger. The processing device may receive signals from such sensors and control operation of a plunger actuator of the autosampler based on the received signals.

The first logic 1002 may receive an initial rinse solvent selection and receive a final rinse solvent selection when the initial rinse solvent selection includes a volatile rinse solvent, such as by a user input. In various embodiments, the user input can be received through selection of graphical user interface elements, as text input, by voice command, and the like. The first logic 1002 can receive the input by identifying a change of state of a switch on a scientific instrument or by receiving a selection of a dropdown menu element. The first logic 1002 can provide a list of final rinse solvents based on the initial rinse solvent selection, such as in response to the initial first logic 1002 selection including a volatile solvent. The list of final rinse solvents can include low volatility solvents that are miscible in the selected initial rinse solvent.

The second logic 1004 may include logic to detect the installation of a new syringe and rinse the syringe at a slow speed with a low volatility solvent when a new syringe in installed. The second logic 1004 can detect the installation of the new syringe by receiving an user input or by automatically determining the new syringe is installed.

The third logic 1006 may monitor the force when moving the plunger of the syringe. The third logic 1006 can include logic to rinse the syringe at a slow speed when the force is above a threshold. The third logic 1006 can include logic to rinse the syringe multiple times when the force is above a threshold. The third logic 1006 can include logic to notify a user to clean or replace the syringe when the force remains above a threshold.

The fourth logic 1008 may determine a maximum time before wetting a syringe. Wetting can include rinsing, washing, drawing a sample, injecting a sample, or any other action that wets the syringe. The fourth logic 1008 can determine the maximum time as a function of solvent volatility, temperature, needle length, needle internal bore size, barrel internal bore size, surface tension of solvent, or any combination thereof. The fourth logic 1008 can provide a warning of a long idle time when a method will result in a syringe being idle longer than the maximum time before wetting a syringe. The warning can include an option to perform a rinse between runs when the syringe has been idle longer than the maximum idle time.

The fifth logic 1010 may control an autosampler to wet the syringe. The fifth logic 1010 can include logic to automatically wet the syringe when the time since last use of the syringe exceeds the maximum time determined by the fourth logic 1008. The fifth logic 1010 can determine the amount of solvent remaining in a solvent bottle and determine if solvent bottle has sufficient solvent to complete the sample sequence. The fifth logic 1010 can prevent rinsing the syringe when there is insufficient solvent remaining in the solvent bottle. The fifth logic 1010 can alert a user to a low solvent condition. The fifth logic 1010 can control an autosampler to rinse a syringe with a first solvent and rinse the syringe with the second solvent based at least in part on the initial rinse solvent selection and the final rinse solvent selection. The fifth logic 1010 may include logic to retain a volume of the final rinse solvent in the syringe between injections and to expel any remaining solvent from the syringe before drawing up a sample for injection.

The sixth logic 1012 may receive an input that the syringe will be removed and to rinse the syringe additional times in response to the input that the syringe will be removed. In various embodiments, the sixth logic 1012 can trigger a final rinse procedure that can include flushing the syringe one or more times with a solvent in which the sample is highly soluble. The syringe can then be rinsed with one or more solvents which are preferably miscible with the first solvent. The final rinse procedure can also include a deionized water rinse and a final rinse in acetone to dry the syringe for storage. In various embodiments, the sixth logic 1012 may automatically select the solvents and the number of rinses, such as based on the solvents used to rinse between injections.

Figure 2:
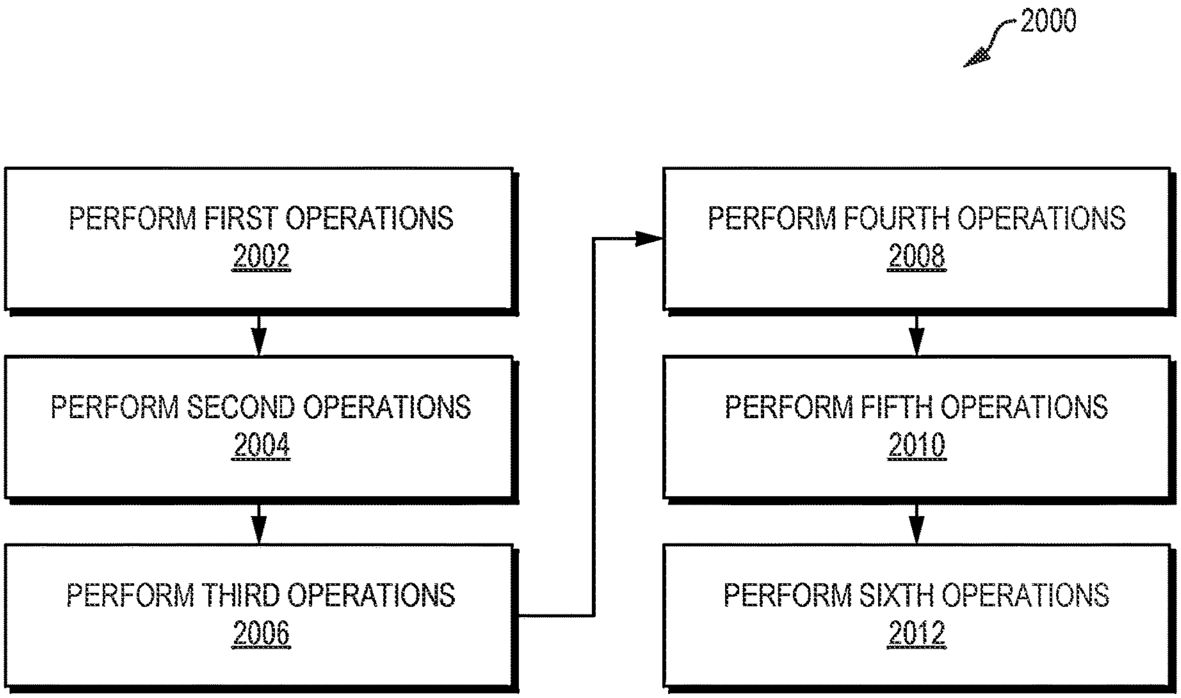
FIG. 2 is a flow diagram of an example method of performing support operations, in accordance with various embodiments.

FIG. 2 is a flow diagram of a method 2000 of performing support operations, in accordance with various embodiments. Although the operations of the method 2000 may be illustrated with reference to particular embodiments disclosed herein (e.g., the scientific instrument support modules 1000 discussed herein with reference to FIG. A, the GUI 3000 discussed herein with reference to FIG. 3, the computing devices 4000 discussed herein with reference to FIG. 4, and/or the scientific instrument support system 5000 discussed herein with reference to FIG. 5), the method 2000 may be used in any suitable setting to perform any suitable support operations. Operations are illustrated once each and in a particular order in FIG. 2, but the operations may be reordered and/or repeated as desired and appropriate (e.g., different operations performed may be performed in parallel, as suitable).

At 2002, first operations may be performed. For example, the first logic 1002 of a support module 1000 may perform the operations of 2002. The first operations may include receiving an initial rinse solvent selection and receive a final rinse solvent selection when the initial rinse solvent selection includes a volatile rinse solvent, such as by a user input. In various embodiments, the user input can be received through selection of graphical user interface elements, as text input, by voice command, and the like. The first operations can include providing a list of final rinse solvents based on the initial rinse solvent selection, such as in response to the initial selection including a volatile solvent. The list of final rinse solvents can include low volatility solvents that are miscible in the selected initial rinse solvent At 2004, second operations may be performed. For example, the second logic 1004 of a support module 1000 may perform the operations of 2004. The second operations may include detecting the installation of a new syringe and rinsing the syringe at a slow speed with a low volatility solvent when a new syringe in installed. Detecting the installation of the new syringe can include automatically determining the new syringe is installed or receiving a user input to indicate a new syringe has been installed.

At 2006, third operations may be performed. For example, the third logic 1006 of a support module 1000 may perform the operations of 2006. The third operations may include monitoring the force when moving the plunger of the syringe. The third operations may include rinsing the syringe at a slow speed when the force is above a threshold and/or rinsing the syringe multiple times when the force is above a threshold. The third operations may include notifying a user to clean or replace the syringe when the force remains above a threshold after rinsing.

At 2008, fourth operations may be performed. For example, the fourth logic 1006 of a support module 1000 may perform the operations of 2006. The fourth operations may include determine a maximum time before wetting a syringe. Wetting can include rinsing, washing, drawing a sample, injecting a sample, or any other action that wets the syringe. The fourth logic 1008 can determine the maximum time as a function of solvent volatility, temperature, needle length, needle internal bore size, barrel internal bore size, surface tension of solvent, or any combination thereof. The fourth logic 1008 can provide a warning of a long idle time when a method will result in a syringe being idle longer than the maximum time before wetting a syringe.

At 2010, fifth operations may be performed. For example, the fifth logic 1010 of a support module 1000 may perform the operations of 2010. The fifth operations may include controlling an autosampler to wet the syringe. The fifth operations can include automatically wetting the syringe when the time since last use of the syringe exceeds the maximum time determined by the fourth operations. The fifth operations can include determining the amount of solvent remaining in a solvent bottle and prevent rinsing the syringe when there is insufficient solvent remaining in the solvent bottle. The fifth operations can include determining if solvent bottle has sufficient solvent to complete the sample sequence and alert a user to a low solvent condition. The fifth operations can include controlling an autosampler to rinse a syringe with a first solvent and rinse the syringe with the second solvent based at least in part on the initial rinse solvent selection and the final rinse solvent selection. The fifth operations can include retaining a volume of the final rinse solvent in the syringe between injections and to expel any remaining solvent from the syringe before drawing up a sample for injection.

At 2012, sixth operations may be performed. For example, the sixth logic 1012 of a support module 1000 may perform the operations of 2012. The sixth operations may include receiving an input that the syringe will be removed and rinsing the syringe additional times in response to the input that the syringe will be removed.

Figure 4:
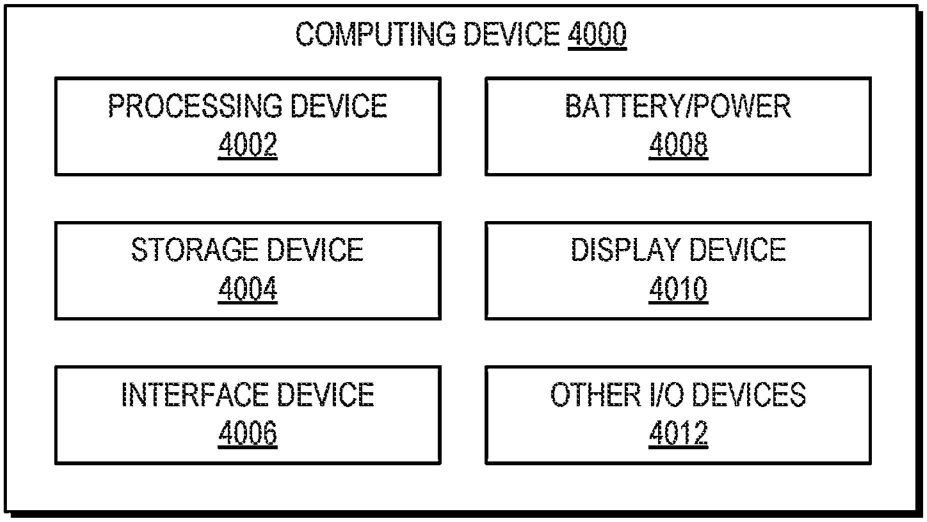
FIG. 4 is a block diagram of an example computing device that may perform some or all of the scientific instrument support methods disclosed herein, in accordance with various embodiments.
Figure 5:
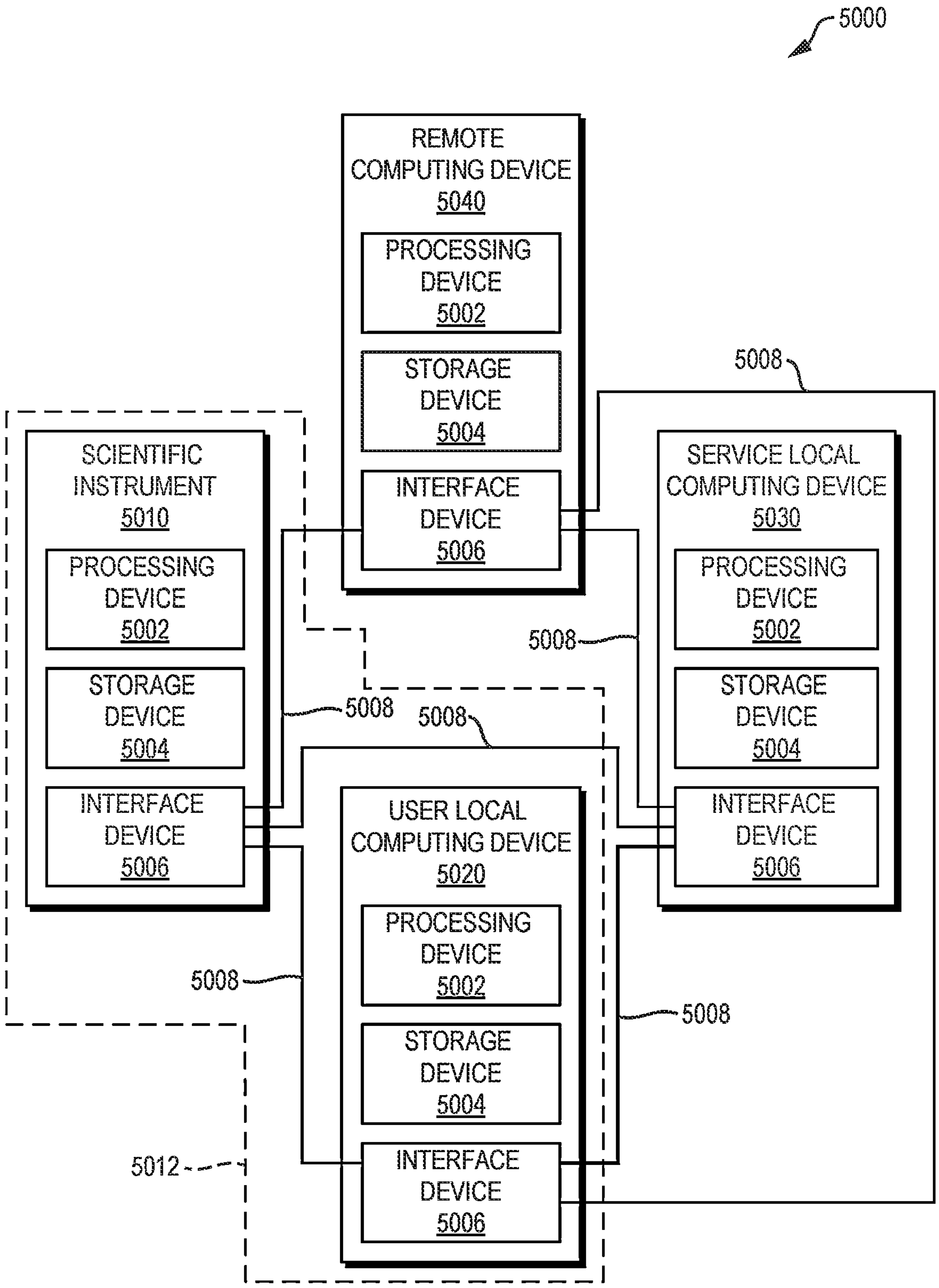
FIG. 5 is a block diagram of an example scientific instrument support system in which some or all of the scientific instrument support methods disclosed herein may be performed, in accordance with various embodiments.

The scientific instrument support methods disclosed herein may include interactions with a human user (e.g., via the user local computing device 5020 discussed herein with reference to FIG. 5). These interactions may include providing information to the user (e.g., information regarding the operation of a scientific instrument such as the scientific instrument 5010 of FIG. 5, information regarding a sample being analyzed or other test or measurement performed by a scientific instrument, information retrieved from a local or remote database, or other information) or providing an option for a user to input commands (e.g., to control the operation of a scientific instrument such as the scientific instrument 5010 of FIG. 5, or to control the analysis of data generated by a scientific instrument), queries (e.g., to a local or remote database), or other information. In some embodiments, these interactions may be performed through a graphical user interface (GUI) that includes a visual display on a display device (e.g., the display device 4010 discussed herein with reference to FIG. 4) that provides outputs to the user and/or prompts the user to provide inputs (e.g., via one or more input devices, such as a keyboard, mouse, trackpad, or touchscreen, included in the other I/O devices 4012 discussed herein with reference to FIG. 4). The scientific instrument support systems disclosed herein may include any suitable GUIs for interaction with a user.

Figure 3:
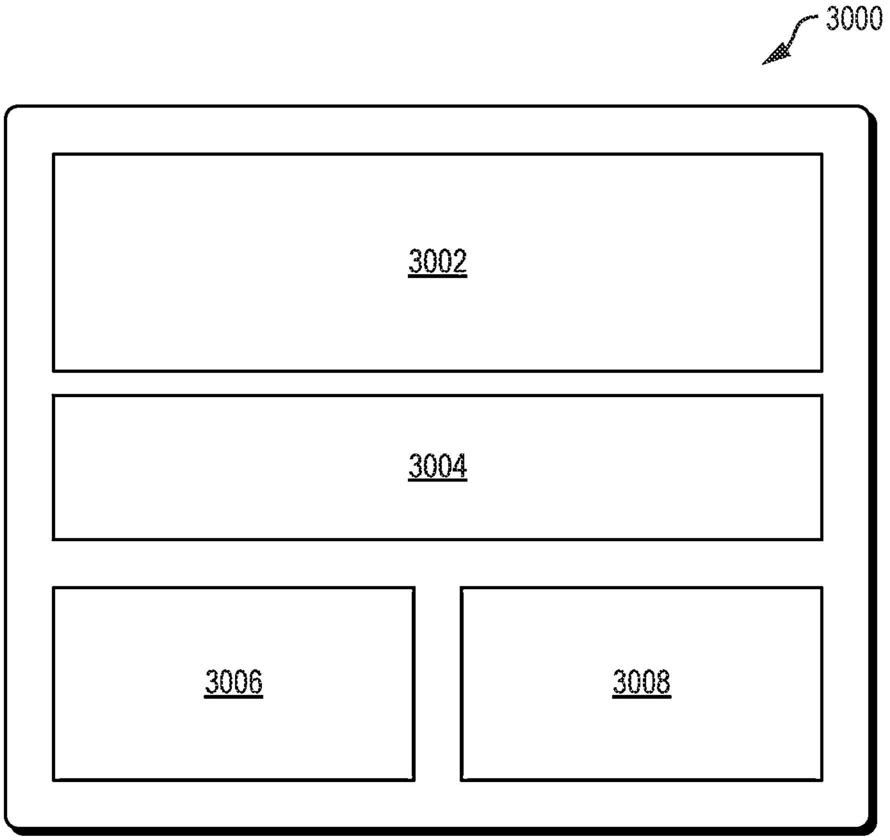
FIG. 3 is an example of a graphical user interface that may be used in the performance of some or all of the support methods disclosed herein, in accordance with various embodiments.

FIG. 3 depicts an example GUI 3000 that may be used in the performance of some or all of the support methods disclosed herein, in accordance with various embodiments. As noted above, the GUI 3000 may be provided on a display device (e.g., the display device 4010 discussed herein with reference to FIG. 4) of a computing device (e.g., the computing device 4000 discussed herein with reference to FIG. 4) of a scientific instrument support system (e.g., the scientific instrument support system 5000 discussed herein with reference to FIG. 5), and a user may interact with the GUI 3000 using any suitable input device (e.g., any of the input devices included in the other I/O devices 4012 discussed herein with reference to FIG. 4) and input technique (e.g., movement of a cursor, motion capture, facial recognition, gesture detection, voice recognition, actuation of buttons, etc.).

The GUI 3000 may include a data display region 3002, a data analysis region 3004, a scientific instrument control region 3006, and a settings region 3008. The particular number and arrangement of regions depicted in FIG. 3 is simply illustrative, and any number and arrangement of regions, including any desired features, may be included in a GUI 3000.

The data display region 3002 may display data generated by a scientific instrument (e.g., the scientific instrument 5010 discussed herein with reference to FIG. 5). For example, the data display region 3002 may display a chromatogram or a mass spectrum.

The data analysis region 3004 may display the results of data analysis (e.g., the results of analyzing the data illustrated in the data display region 3002 and/or other data). For example, the data analysis region 3004 may display retention times, peak heights, peak areas, compound identifications, or the like. In some embodiments, the data display region 3002 and the data analysis region 3004 may be combined in the GUI 3000 (e.g., to include data output from a scientific instrument, and some analysis of the data, in a common graph or region).

The scientific instrument control region 3006 may include options that allow the user to control a scientific instrument (e.g., the scientific instrument 5010 discussed herein with reference to FIG. 5). For example, the scientific instrument control region 3006 may include a wash solvent selection interface including options for a first wash solvent. In some embodiments, the selection of the first wash solvent with high volatility may prompt for a selection of a second wash solvent with low volatility. The options for the first wash solvent selection and the second wash solvent selection may be in the form of a drop-down menu or other selection element. The choices allowed for the second wash solvent selection may be limited to low volatility solvents, and may be further limited to solvents that are miscible with the first wash solvent selection. The scientific instrument control region 3006 may include an option to automatically wash the syringe when the syringe is idle for longer than a maximum idle time, such as a maximum time without wetting the syringe. In various embodiments, the maximum idle time can be a user settable parameter or the maximum idle time can be automatically determined based on a number of factors such as solvent volatility, needle length, needle internal bore size, barrel internal bore size, surface tension of solvent, temperature, and the like. FIGS. 7-12 illustrate the relationships between evaporation rate and various parameters that can be used in determining the maximum idle time.

The scientific instrument control region 3006 may provide a long idle time warning if the sample sequence will result in the syringe being idle for longer than the maximum idle time and provide an option to automatically rinse the syringe during that period.

The scientific instrument control region 3006 may provide an option to perform a solvent check to ensure sufficient solvent is available before starting a sample sequence or to pause the sample sequence if an amount of solvent drops below a threshold.

In further embodiments, the scientific instrument control region 3006 may include an input region to define the syringe type or to enter a needle length, needle internal bore size, and/or barrel internal bore size.

In still further embodiments, the scientific instrument control region 3006 may include buttons, text input boxes, pull down menus, and other GUI interface elements to enable the user to indicate they intend to remove the syringe or they have installed a new syringe.

The settings region 3008 may include options that allow the user to control the features and functions of the GUI 3000 (and/or other GUIs) and/or perform common computing operations with respect to the data display region 3002 and data analysis region 3004 (e.g., saving data on a storage device, such as the storage device 4004 discussed herein with reference to FIG. 4, sending data to another user, labeling data, etc.).

As noted above, the scientific instrument support module 1000 may be implemented by one or more computing devices. FIG. 4 is a block diagram of a computing device 4000 that may perform some or all of the scientific instrument support methods disclosed herein, in accordance with various embodiments. In some embodiments, the scientific instrument support module 1000 may be implemented by a single computing device 4000 or by multiple computing devices 4000. Further, as discussed below, a computing device 4000 (or multiple computing devices 4000) that implements the scientific instrument support module 1000 may be part of one or more of the scientific instrument 5010, the user local computing device 5020, the service local computing device 5030, or the remote computing device 5040 of FIG. 5.

The computing device 4000 of FIG. 4 is illustrated as having a number of components, but any one or more of these components may be omitted or duplicated, as suitable for the application and setting. In some embodiments, some or all of the components included in the computing device 4000 may be attached to one or more motherboards and enclosed in a housing (e.g., including plastic, metal, and/or other materials). In some embodiments, some these components may be fabricated onto a single system-on-a-chip (SoC) (e.g., an SoC may include one or more processing devices 4002 and one or more storage devices 4004). Additionally, in various embodiments, the computing device 4000 may not include one or more of the components illustrated in FIG. 4, but may include interface circuitry (not shown) for coupling to the one or more components using any suitable interface (e.g., a Universal Serial Bus (USB) interface, a High-Definition Multimedia Interface (HDMI) interface, a Controller Area Network (CAN) interface, a Serial Peripheral Interface (SPI) interface, an Ethernet interface, a wireless interface, or any other appropriate interface). For example, the computing device 4000 may not include a display device 4010, but may include display device interface circuitry (e.g., a connector and driver circuitry) to which a display device 4010 may be coupled.

The computing device 4000 may include a processing device 4002 (e.g., one or more processing devices). As used herein, the term "processing device" may refer to any device or portion of a device that processes electronic data from registers and/or memory to transform that electronic data into other electronic data that may be stored in registers and/or memory. The processing device 4002 may include one or more digital signal processors (DSPs), application-specific integrated circuits (ASICs), central processing units (CPUs), graphics processing units (GPUs), cryptoprocessors (specialized processors that execute cryptographic algorithms within hardware), server processors, or any other suitable processing devices.

The computing device 4000 may include a storage device 4004 (e.g., one or more storage devices). The storage device 4004 may include one or more memory devices such as random access memory (RAM) (e.g., static RAM (SRAM) devices, magnetic RAM (MRAM) devices, dynamic RAM (DRAM) devices, resistive RAM (RRAM) devices, or conductive-bridging RAM (CBRAM) devices), hard drive-based memory devices, solid-state memory devices, networked drives, cloud drives, or any combination of memory devices. In some embodiments, the storage device 4004 may include memory that shares a die with a processing device 4002. In such an embodiment, the memory may be used as cache memory and may include embedded dynamic random access memory (eDRAM) or spin transfer torque magnetic random access memory (STT-MRAM), for example. In some embodiments, the storage device 4004 may include non-transitory computer readable media having instructions thereon that, when executed by one or more processing devices (e.g., the processing device 4002), cause the computing device 4000 to perform any appropriate ones of or portions of the methods disclosed herein.

The computing device 4000 may include an interface device 4006 (e.g., one or more interface devices 4006). The interface device 4006 may include one or more communication chips, connectors, and/or other hardware and software to govern communications between the computing device 4000 and other computing devices. For example, the interface device 4006 may include circuitry for managing wireless communications for the transfer of data to and from the computing device 4000. The term "wireless" and its derivatives may be used to describe circuits, devices, systems, methods, techniques, communications channels, etc., that may communicate data through the use of modulated electromagnetic radiation through a nonsolid medium. The term does not imply that the associated devices do not contain any wires, although in some embodiments they might not. Circuitry included in the interface device 4006 for managing wireless communications may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultra mobile broadband (UMB) project (also referred to as "3GPP2"), etc.). In some embodiments, circuitry included in the interface device 4006 for managing wireless communications may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. In some embodiments, circuitry included in the interface device 4006 for managing wireless communications may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). In some embodiments, circuitry included in the interface device 4006 for managing wireless communications may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. In some embodiments, the interface device 4006 may include one or more antennas (e.g., one or more antenna arrays) to receipt and/or transmission of wireless communications.

In some embodiments, the interface device 4006 may include circuitry for managing wired communications, such as electrical, optical, or any other suitable communication protocols. For example, the interface device 4006 may include circuitry to support communications in accordance with Ethernet technologies. In some embodiments, the interface device 4006 may support both wireless and wired communication, and/or may support multiple wired communication protocols and/or multiple wireless communication protocols. For example, a first set of circuitry of the interface device 4006 may be dedicated to shorter-range wireless communications such as Wi-Fi or Bluetooth, and a second set of circuitry of the interface device 4006 may be dedicated to longer-range wireless communications such as global positioning system (GPS), EDGE, GPRS, CDMA, WiMAX, LTE, EV-DO, or others. In some embodiments, a first set of circuitry of the interface device 4006 may be dedicated to wireless communications, and a second set of circuitry of the interface device 4006 may be dedicated to wired communications.

The computing device 4000 may include battery/power circuitry 4008. The battery/power circuitry 4008 may include one or more energy storage devices (e.g., batteries or capacitors) and/or circuitry for coupling components of the computing device 4000 to an energy source separate from the computing device 4000 (e.g., AC line power).

The computing device 4000 may include a display device 4010 (e.g., multiple display devices). The display device 4010 may include any visual indicators, such as a heads-up display, a computer monitor, a projector, a touchscreen display, a liquid crystal display (LCD), a light-emitting diode display, or a flat panel display.

The computing device 4000 may include other input/output (I/O) devices 4012. The other I/O devices 4012 may include one or more audio output devices (e.g., speakers, headsets, earbuds, alarms, etc.), one or more audio input devices (e.g., microphones or microphone arrays), location devices (e.g., GPS devices in communication with a satellite-based system to receive a location of the computing device 4000, as known in the art), audio codecs, video codecs, printers, sensors (e.g., thermocouples or other temperature sensors, humidity sensors, pressure sensors, vibration sensors, accelerometers, gyroscopes, etc.), image capture devices such as cameras, keyboards, cursor control devices such as a mouse, a stylus, a trackball, or a touchpad, bar code readers, Quick Response (QR) code readers, or radio frequency identification (RFID) readers, for example.

The computing device 4000 may have any suitable form factor for its application and setting, such as a handheld or mobile computing device (e.g., a cell phone, a smart phone, a mobile internet device, a tablet computer, a laptop computer, a netbook computer, an ultrabook computer, a personal digital assistant (PDA), an ultra mobile personal computer, etc.), a desktop computing device, or a server computing device or other networked computing component.

One or more computing devices implementing any of the scientific instrument support modules or methods disclosed herein may be part of a scientific instrument support system. FIG. 5 is a block diagram of an example scientific instrument support system 5000 in which some or all of the scientific instrument support methods disclosed herein may be performed, in accordance with various embodiments. The scientific instrument support modules and methods disclosed herein (e.g., the scientific instrument support module 1000 of FIG. A and the method 2000 of FIG. B) may be implemented by one or more of the scientific instrument 5010, the user local computing device 5020, the service local computing device 5030, or the remote computing device 5040 of the scientific instrument support system 5000.

Any of the scientific instrument 5010, the user local computing device 5020, the service local computing device 5030, or the remote computing device 5040 may include any of the embodiments of the computing device 4000 discussed herein with reference to FIG. 4, and any of the scientific instrument 5010, the user local computing device 5020, the service local computing device 5030, or the remote computing device 5040 may take the form of any appropriate ones of the embodiments of the computing device 4000 discussed herein with reference to FIG. 4.

The scientific instrument 5010, the user local computing device 5020, the service local computing device 5030, or the remote computing device 5040 may each include a processing device 5002, a storage device 5004, and an interface device 5006. The processing device 5002 may take any suitable form, including the form of any of the processing devices 4002 discussed herein with reference to FIG. 4, and the processing devices 5002 included in different ones of the scientific instrument 5010, the user local computing device 5020, the service local computing device 5030, or the remote computing device 5040 may take the same form or different forms. The storage device 5004 may take any suitable form, including the form of any of the storage devices 5004 discussed herein with reference to FIG. 4, and the storage devices 5004 included in different ones of the scientific instrument 5010, the user local computing device 5020, the service local computing device 5030, or the remote computing device 5040 may take the same form or different forms. The interface device 5006 may take any suitable form, including the form of any of the interface devices 4006 discussed herein with reference to FIG. 4, and the interface devices 5006 included in different ones of the scientific instrument 5010, the user local computing device 5020, the service local computing device 5030, or the remote computing device 5040 may take the same form or different forms.

The scientific instrument 5010, the user local computing device 5020, the service local computing device 5030, and the remote computing device 5040 may be in communication with other elements of the scientific instrument support system 5000 via communication pathways 5008. The communication pathways 5008 may communicatively couple the interface devices 5006 of different ones of the elements of the scientific instrument support system 5000, as shown, and may be wired or wireless communication pathways (e.g., in accordance with any of the communication techniques discussed herein with reference to the interface devices 4006 of the computing device 4000 of FIG. 4). The particular scientific instrument support system 5000 depicted in FIG. 5 includes communication pathways between each pair of the scientific instrument 5010, the user local computing device 5020, the service local computing device 5030, and the remote computing device 5040, but this "fully connected" implementation is simply illustrative, and in various embodiments, various ones of the communication pathways 5008 may be absent. For example, in some embodiments, a service local computing device 5030 may not have a direct communication pathway 5008 between its interface device 5006 and the interface device 5006 of the scientific instrument 5010, but may instead communicate with the scientific instrument 5010 via the communication pathway 5008 between the service local computing device 5030 and the user local computing device 5020 and the communication pathway 5008 between the user local computing device 5020 and the scientific instrument 5010.

The scientific instrument 5010 may include any appropriate scientific instrument, such as an autosampler for gas chromatograph or a gas chromatography-mass spectrometer.

The user local computing device 5020 may be a computing device (e.g., in accordance with any of the embodiments of the computing device 4000 discussed herein) that is local to a user of the scientific instrument 5010. In some embodiments, the user local computing device 5020 may also be local to the scientific instrument 5010, but this need not be the case; for example, a user local computing device 5020 that is in a user's home or office may be remote from, but in communication with, the scientific instrument 5010 so that the user may use the user local computing device 5020 to control and/or access data from the scientific instrument 5010. In some embodiments, the user local computing device 5020 may be a laptop, smartphone, or tablet device. In some embodiments the user local computing device 5020 may be a portable computing device.

The service local computing device 5030 may be a computing device (e.g., in accordance with any of the embodiments of the computing device 4000 discussed herein) that is local to an entity that services the scientific instrument 5010. For example, the service local computing device 5030 may be local to a manufacturer of the scientific instrument 5010 or to a third-party service company. In some embodiments, the service local computing device 5030 may communicate with the scientific instrument 5010, the user local computing device 5020, and/or the remote computing device 5040 (e.g., via a direct communication pathway 5008 or via multiple "indirect" communication pathways 5008, as discussed above) to receive data regarding the operation of the scientific instrument 5010, the user local computing device 5020, and/or the remote computing device 5040 (e.g., the results of self-tests of the scientific instrument 5010, calibration coefficients used by the scientific instrument 5010, the measurements of sensors associated with the scientific instrument 5010, etc.). In some embodiments, the service local computing device 5030 may communicate with the scientific instrument 5010, the user local computing device 5020, and/or the remote computing device 5040 (e.g., via a direct communication pathway 5008 or via multiple "indirect" communication pathways 5008, as discussed above) to transmit data to the scientific instrument 5010, the user local computing device 5020, and/or the remote computing device 5040 (e.g., to update programmed instructions, such as firmware, in the scientific instrument 5010, to initiate the performance of test or calibration sequences in the scientific instrument 5010, to update programmed instructions, such as software, in the user local computing device 5020 or the remote computing device 5040, etc.). A user of the scientific instrument 5010 may utilize the scientific instrument 5010 or the user local computing device 5020 to communicate with the service local computing device 5030 to report a problem with the scientific instrument 5010 or the user local computing device 5020, to request a visit from a technician to improve the operation of the scientific instrument 5010, to order consumables or replacement parts associated with the scientific instrument 5010, or for other purposes.

The remote computing device 5040 may be a computing device (e.g., in accordance with any of the embodiments of the computing device 4000 discussed herein) that is remote from the scientific instrument 5010 and/or from the user local computing device 5020. In some embodiments, the remote computing device 5040 may be included in a datacenter or other large-scale server environment. In some embodiments, the remote computing device 5040 may include network-attached storage (e.g., as part of the storage device 5004). The remote computing device 5040 may store data generated by the scientific instrument 5010, perform analyses of the data generated by the scientific instrument 5010 (e.g., in accordance with programmed instructions), facilitate communication between the user local computing device 5020 and the scientific instrument 5010, and/or facilitate communication between the service local computing device 5030 and the scientific instrument 5010.

In some embodiments, one or more of the elements of the scientific instrument support system 5000 illustrated in FIG. 5 may not be present. Further, in some embodiments, multiple ones of various ones of the elements of the scientific instrument support system 5000 of FIG. 5 may be present. For example, a scientific instrument support system 5000 may include multiple user local computing devices 5020 (e.g., different user local computing devices 5020 associated with different users or in different locations). In another example, a scientific instrument support system 5000 may include multiple scientific instruments 5010, all in communication with service local computing device 5030 and/or a remote computing device 5040; in such an embodiment, the service local computing device 5030 may monitor these multiple scientific instruments 5010, and the service local computing device 5030 may cause updates or other information may be "broadcast" to multiple scientific instruments 5010 at the same time. Different ones of the scientific instruments 5010 in a scientific instrument support system 5000 may be located close to one another (e.g., in the same room) or farther from one another (e.g., on different floors of a building, in different buildings, in different cities, etc.). In some embodiments, a scientific instrument 5010 may be connected to an Internet-of-Things (IOT) stack that allows for command and control of the scientific instrument 5010 through a web-based application, a virtual or augmented reality application, a mobile application, and/or a desktop application. Any of these applications may be accessed by a user operating the user local computing device 5020 in communication with the scientific instrument 5010 by the intervening remote computing device 5040. In some embodiments, a scientific instrument 5010 may be sold by the manufacturer along with one or more associated user local computing devices 5020 as part of a local scientific instrument computing unit 5012.

In some embodiments, different ones of the scientific instruments 5010 included in a scientific instrument support system 5000 may be different types of scientific instruments 5010; for example, one scientific instrument 5010 may be an autosampler for a gas chromatograph, while another scientific instrument 5010 may be an autosampler for a gas chromatograph-mass spectrometer. In some such embodiments, the remote computing device 5040 and/or the user local computing device 5020 may combine data from different types of scientific instruments 5010 included in a scientific instrument support system 5000.

FIG. 6 illustrates a typical gas chromatograph system 6000. The system includes an injector 6002, a column 6004, and a detector 6006. An autosampler 6008 can be used to supply samples to the injector 6002. In various embodiments, the sample can be a gaseous sample, such as for head space analysis. In other embodiments, the sample can be a liquid sample and the injector can vaporize the liquid sample into a gaseous state. The autosampler 6008 can use a syringe to draw the sample from a sample vial and inject the sample into the injector 6002. Autosampler 6008 can include a plunger-force sensor 6012 configured to generate signals indicative of force applied to the plunger of the syringe. The autosampler 6008 can access multiple samples, blanks, and solutions which allows the autosampler 6008 to automatically provide a series of samples to the gas chromatograph system 6000 and to rinse the syringe between samples. Autosampler 6008 can include a solvent-level sensor 6010 configured to detect a volume or level of solvent in the solvent bottle.

The sample can be moved from the injector 6002 to the column 6004 by a carrier gas. The column 6004 includes a retention medium, typically as a thin coating on the interior surface of the column 6004. The retention medium can differentially retain some compounds from the sample such that the amount of time necessary to transit the column is compound dependent. In this way, the compounds in the vaporized sample can be separated based on the time to transit the column 6004 (retention time).

Upon exiting the column 6004, the compounds can enter the detector 6006. Various detectors can be used as part of a GC system including flame ionization detectors, nitrogen phosphorous detectors, electron capture detectors, thermal conductivity detectors, flame photometric detectors, mass spectrometers, and the like.

Figure 7:
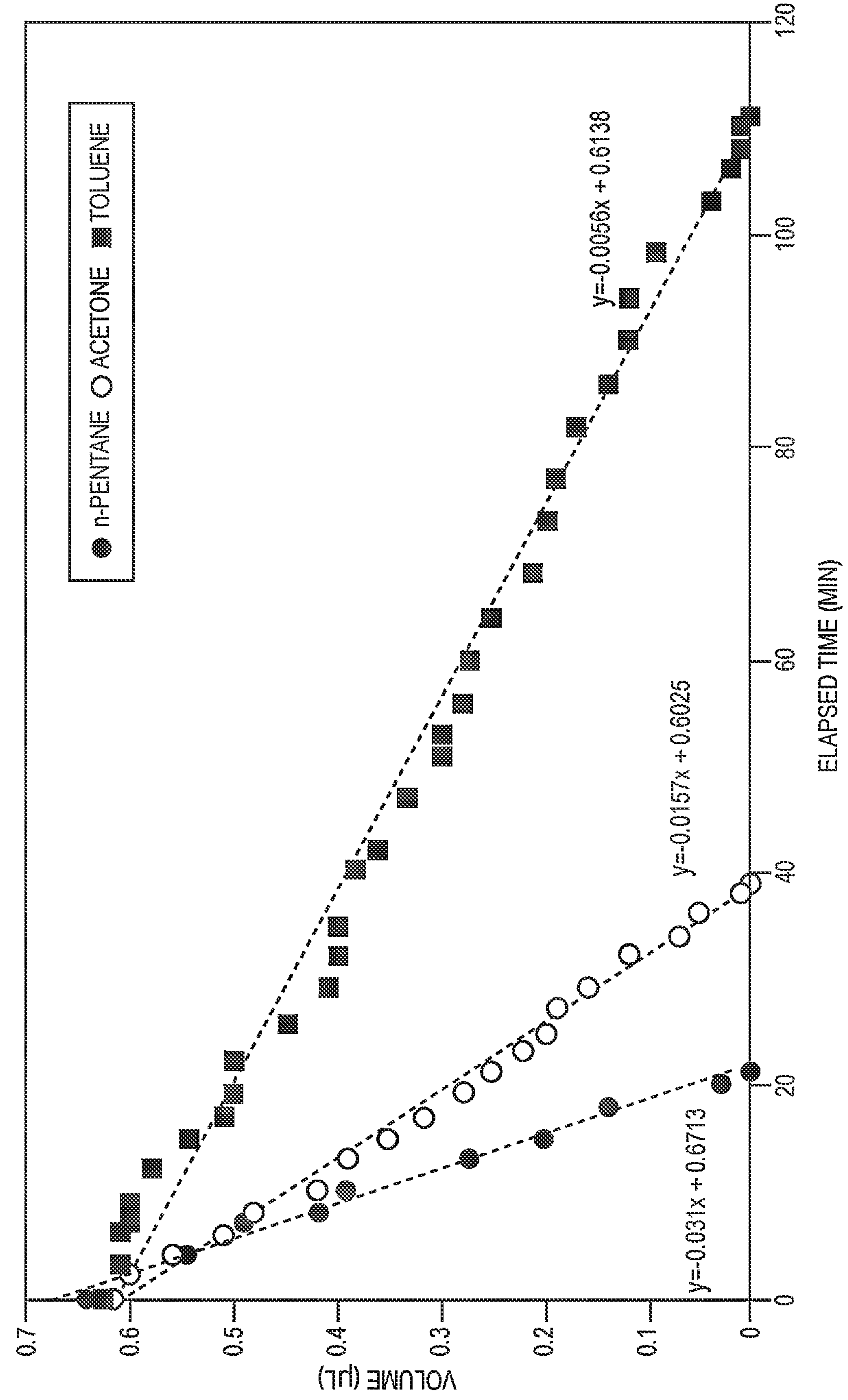
FIG. 7 is a graph illustrating the measured evaporation rate of various solvents from a syringe.

FIG. 7 shows the measured evaporation of n-pentane, acetone, and toluene at 24° C.

Approximately 0.64 μL of solvent remains in the syringe at time 0 min. The volume of solvent remaining is plotted versus the elapsed time. n-Pentane evaporates faster than acetone which evaporates faster than toluene.

Figure 8:
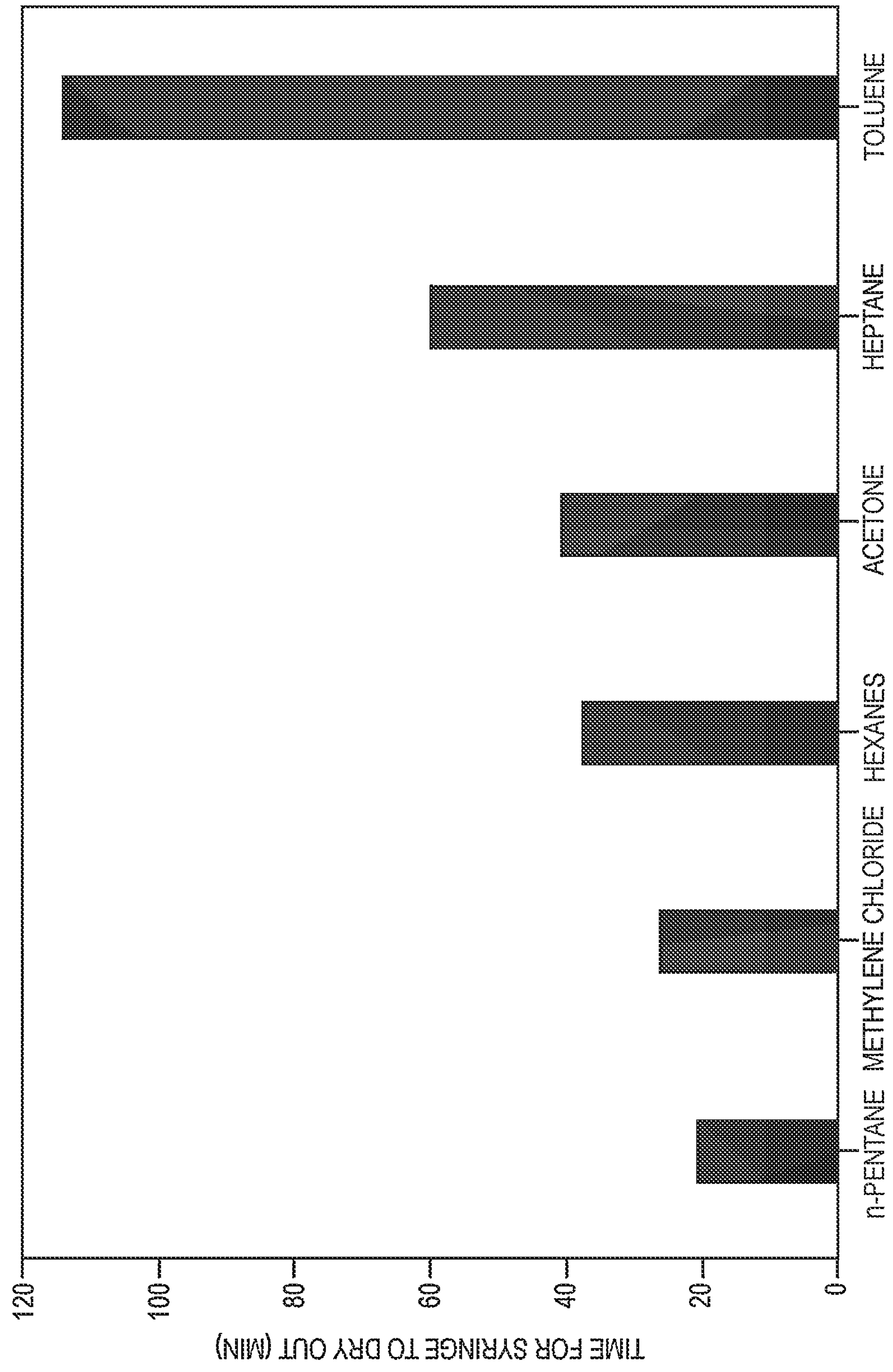
FIG. 8 is a graph illustrating the calculated time before a syringe dries out based on evaporation rate of the solvent.

FIG. 8 shows the calculated time required for the typical 0.64 μL needle volume to evaporate based on the measured evaporation rate. The time between typical gas chromatographic analyses is usually 30 min or so. When using final rinse solvents such as n-pentane and methylene chloride, the syringe will typically dry out before the next run. That is why it is advantageous to use a higher boiling point solvent such as toluene as the final rinse solvent.

Figure 9:
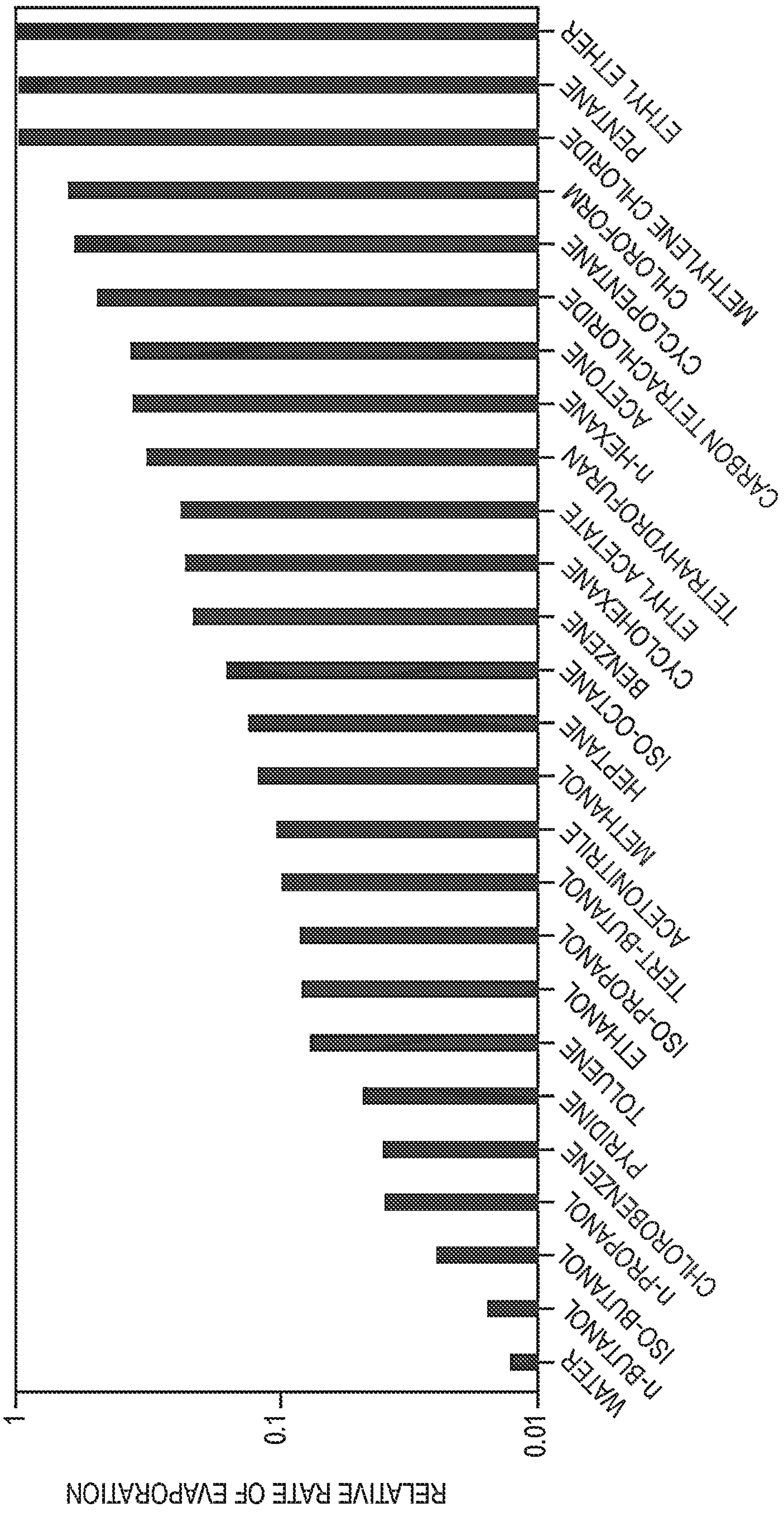
FIG. 9 is a graph illustrating the relative rate of evaporation for various solvents.

FIG. 9 shows the relative rate of evaporation for various solvents at 30° C. calculated based on vapor pressure of the solvents.

Figure 10:
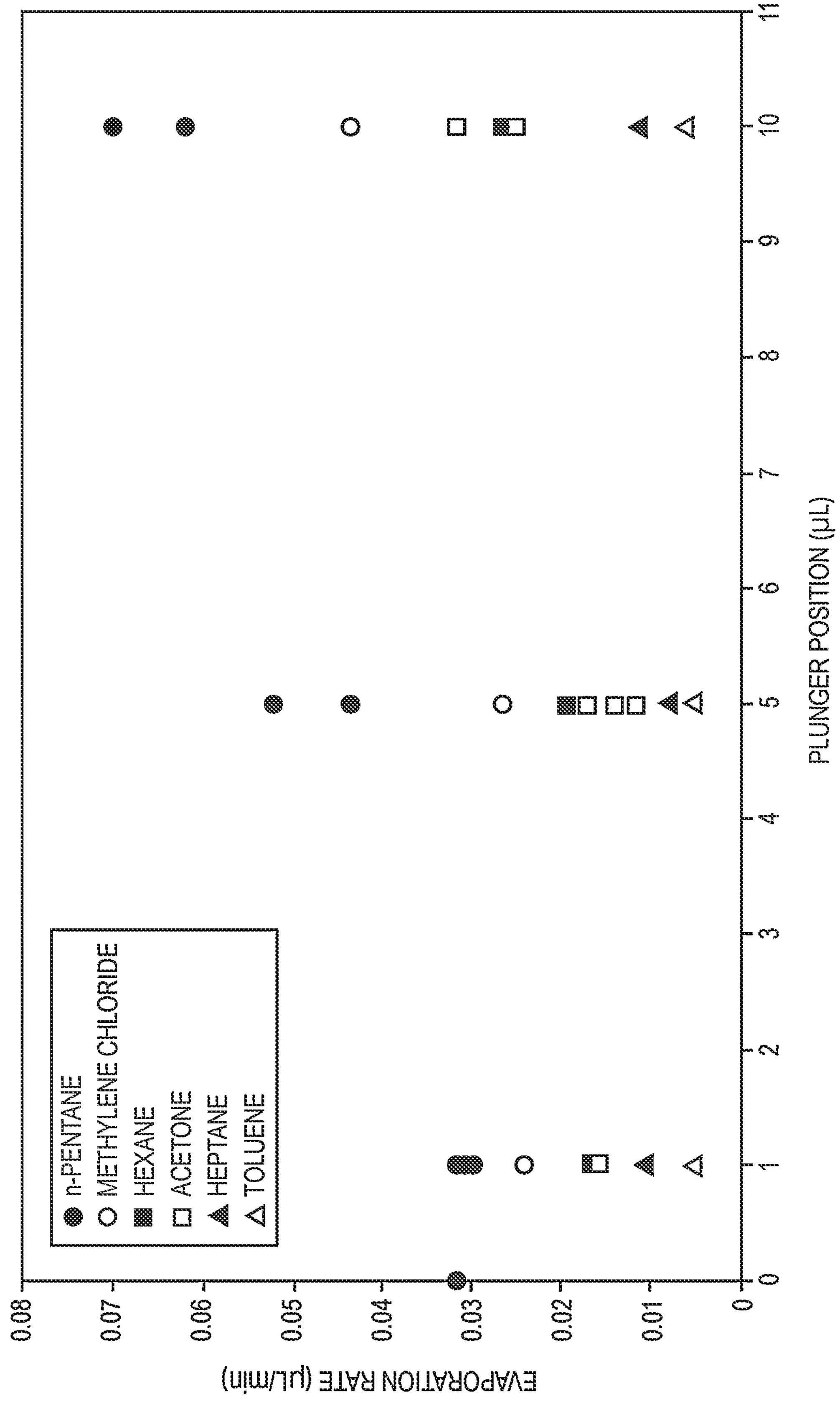
FIGS. 10 and 11 are a graph illustrating the effect of plunger position on evaporation rate.
Figure 11:
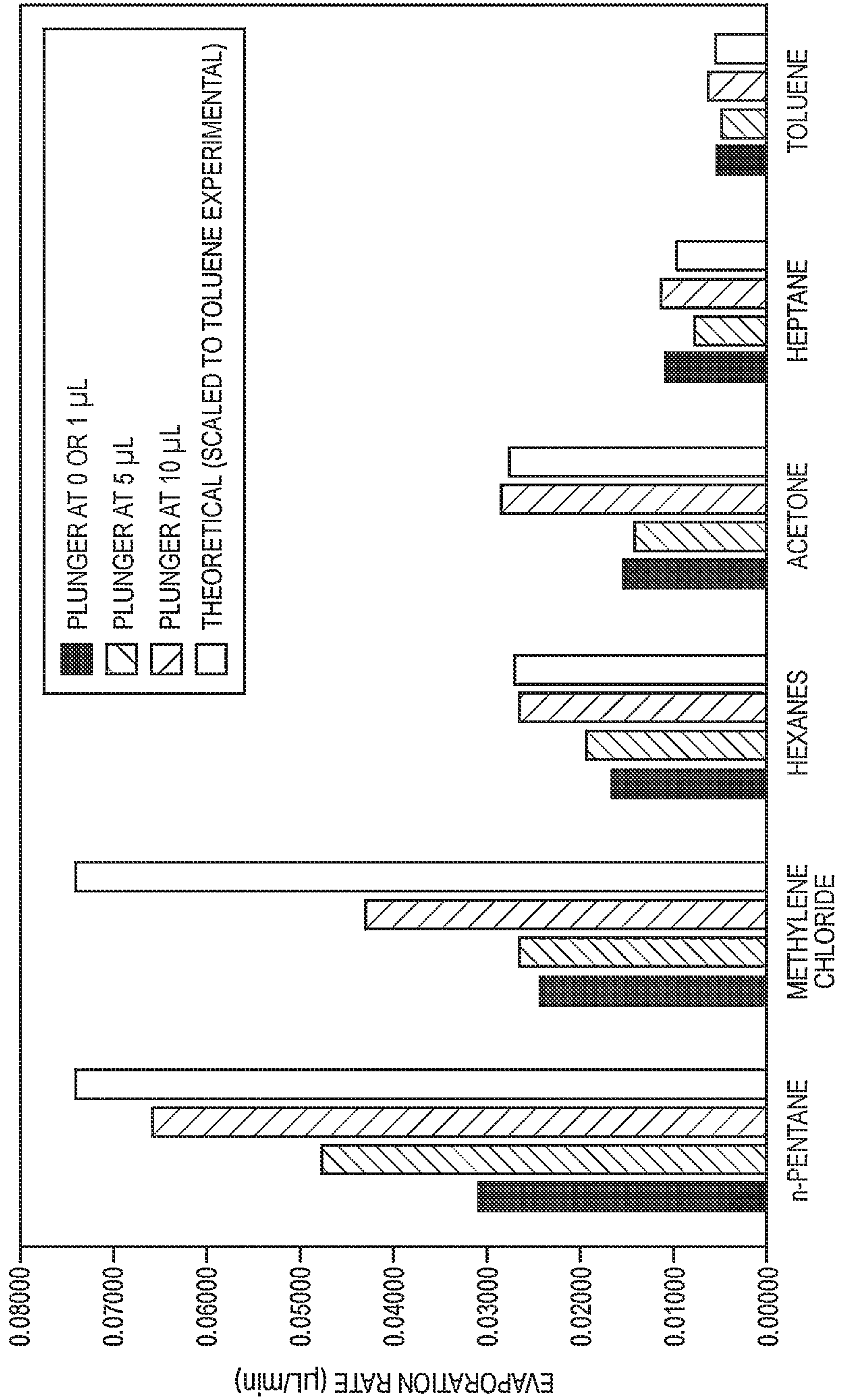

FIGS. 10 and 11 shows evaporation rate as a function of plunger position for various solvents. The evaporation rate is typically lower when the plunger is stored at the 0 or 1 μL position after the final rinse solvent.

Figure 12:
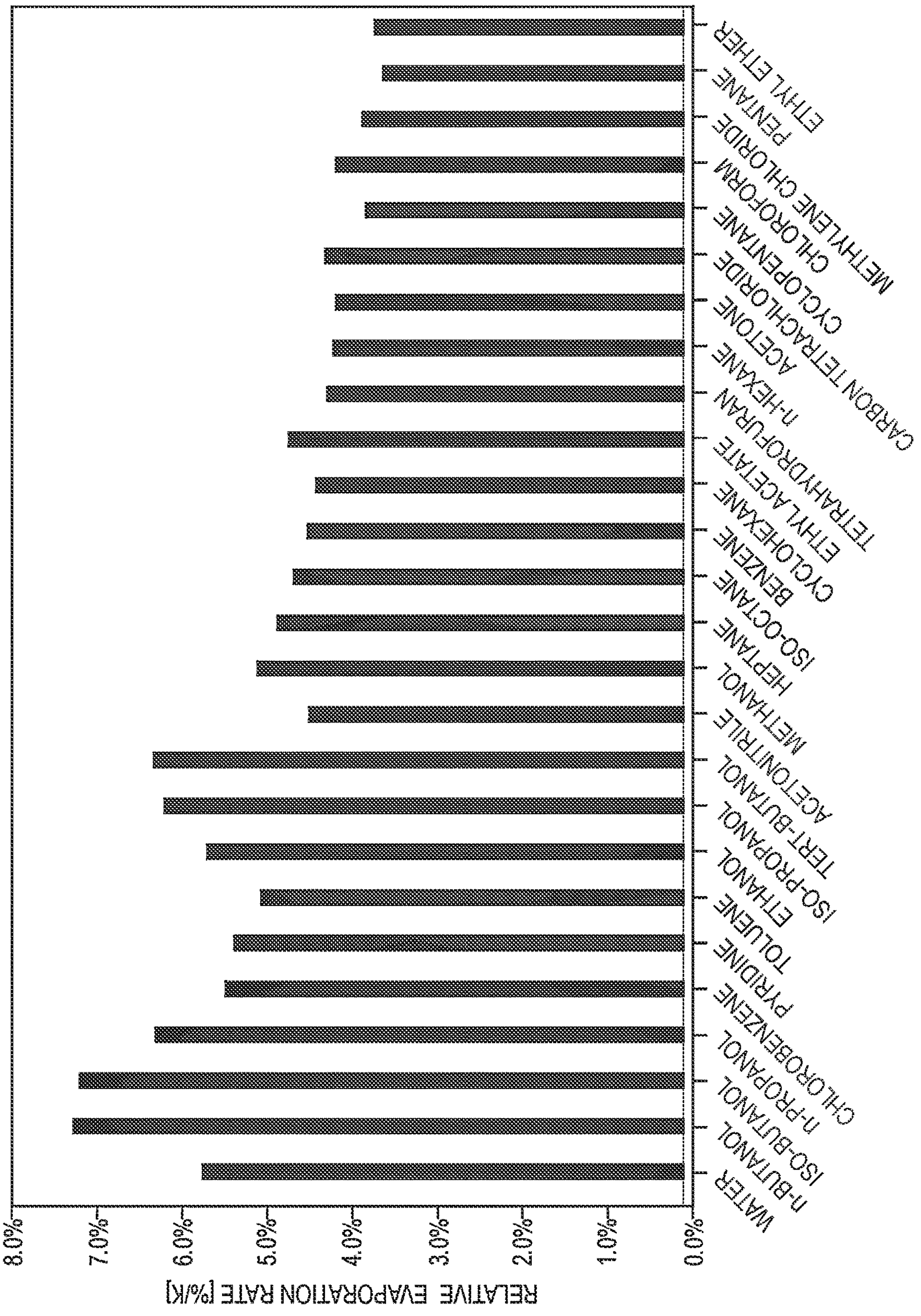
FIG. 12 is a graph illustrating the effect of temperature on relative evaporation rate.

FIG. 12 shows the temperature dependence of the evaporation rate for various solvents. On average, the solvent evaporates approximately 5% faster for every 1° C. increase in temperature. Therefore, it is advantageous to keep the syringe as cool as possible when not being used.

Figure 13:
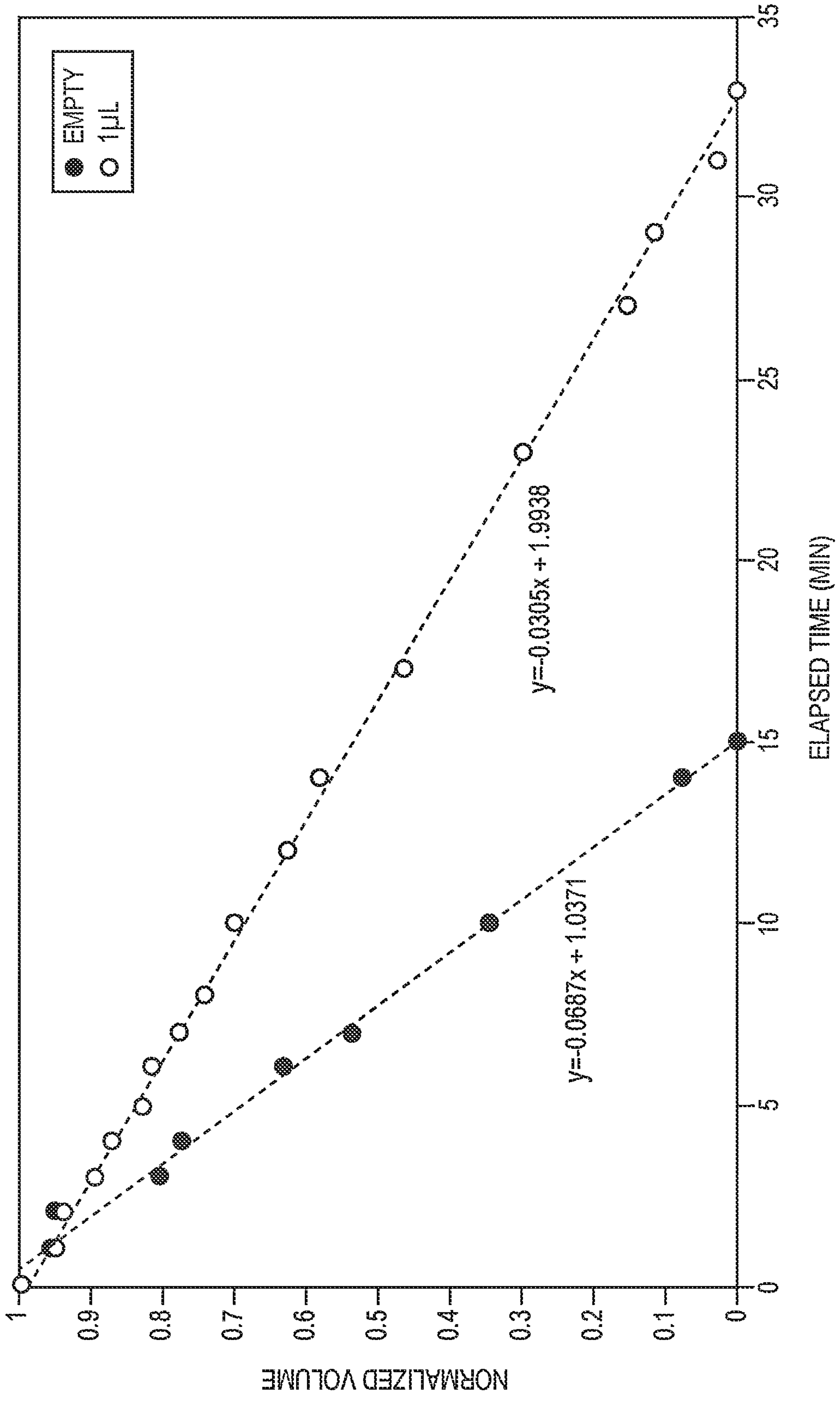
FIG. 13 is a graph illustrating the effect of leaving a small volume of solvent in the syringe.

FIG. 13 shows the difference in the time for n-pentane to evaporate from the syringe based on volume of solvent remaining in the syringe barrel. Typically, all of the final rinse solvent is expelled from the syringe. That leaves only a small amount of solvent in the needle which cannot be expelled. For a typical 10 μL syringe, that residual volume is approximately 0.64 μL. For n-pentane, this residual volume from an "empty" syringe takes approximately 15 min to evaporate. If instead we purposefully leave an additional 1 μL of the final rinse solvent in the syringe, the time to dry out increases to approximately 33 min. Leaving more solvent will further increase the time it takes to completely dry out.

The following paragraphs provide various examples of the embodiments disclosed herein.

Example 1 is a scientific instrument support apparatus, including timing logic to determine a maximum time without wetting for a syringe; and rinsing logic to control an autosampler to rinse the syringe when the maximum time without wetting is reached.

Example 2 may include the subject matter of Example 1, and may further specify that the timing logic and the rinsing logic are implemented by a common computing device.

Example 3 may include the subject matter of Example 1 or 2, and may further specify that at least one of the timing logic and the rinsing logic are implemented in the scientific instrument.

Example 4 may include the subject matter of any of Examples 1-3, and may further specify that the timing logic includes logic to determine the maximum time as a function of solvent volatility, temperature, needle length, needle internal bore size, barrel internal bore size, surface tension of solvent, or any combination thereof.

Example 5 may include the subject matter of any of Examples 1-4, and may further specify that the rinsing logic includes logic to rinse the syringe at a low plunger speed when the time since last use of the syringe exceeds a threshold.

Example 6 may include the subject matter of any of Examples 1-5, and may further specify that the rinsing logic includes logic to determine the amount of solvent remaining in a solvent bottle; and logic to prevent rinsing the syringe when there in insufficient solvent remaining in the solvent bottle.

Example 7 may include the subject matter of Example 6, and may further specify that the rinsing logic includes logic to alert a user to a low solvent condition.

Example 8 may include the subject matter of any of Examples 1-7, and may further specify that the scientific instrument support system further includes a force logic to monitor the force when moving the plunger.

Example 9 may include the subject matter of Example 8, and may further specify that the force logic includes logic to rinse the syringe at a slow speed when the force is above a threshold.

Example 10 may include the subject matter of any of Examples 8-9, and may further specify that the force logic includes logic to rinse the syringe multiple times when the force is above a threshold.

Example 11 may include the subject matter of any of Examples 1-10, and may further specify that the scientific instrument support system further includes a removal logic to rinse the syringe additional times when a user input indicates the syringe will be removed.

Example 12 may include the subject matter of any of Examples 1-11, and may further specify that the scientific instrument support system further includes an install logic to rinse the syringe at a slow speed with a low volatility solvent when a new syringe in installed.

Example 13 may include the subject matter of Example 12, and may further specify that the install logic includes logic to detect the installation of a new syringe.

Example 14 may include the subject matter of Examples 1-13, and may further specify the rinsing logic includes logic to retain a volume of final rinse solvent in the syringe between injections and to expel any remaining solvent from the syringe before drawing up a sample for injection.

Example 15 is a scientific instrument support apparatus, including solvent logic to receive an initial rinse solvent selection and to receive a final rinse solvent selection when the initial rinse solvent selection includes a volatile rinse solvent; and rinsing logic to control an autosampler to rinse a syringe with a first solvent and rinse the syringe with the second solvent based at least in part on the initial rinse solvent selection and the final rinse solvent selection.

Example 16 may include the subject matter of Example 15, and may further specify that the solvent logic is to receive the initial rinse solvent selection by identifying a change of state of a switch on a scientific instrument.

Example 17 may include the subject matter of Example 15 or 16, and may further specify that he the solvent logic is to receive the final rinse solvent selection by receiving a selection of a dropdown menu element from a user.

Example 18 may include the subject matter of any of Example 15-17, and may further specify that the rinsing logic includes logic to check a solvent bottle has sufficient solvent to complete the sample sequence.

Example 19 may include the subject matter of any of Example 15-18, and may further specify that the scientific instrument support apparatus further includes a timing logic to provide a warning of a long idle time when a method will result in a syringe being idle longer than a maximum idle time.

Example 20 may include the subject matter of Example 19, and may further specify that the timing logic includes logic to determine the maximum time as a function of solvent volatility, temperature, needle length, needle internal bore size, barrel internal bore size, surface tension of solvent, or any combination thereof.

Example 21 may include the subject matter of Example 19 or 20, and may further specify that the rinsing logic includes automatically rinsing the syringe when the syringe has been idle longer than the maximum idle time.

Example 22 may include the subject matter of any of Example 15-21, and may further specify that the scientific instrument support apparatus further includes a force logic to monitor a force when moving a plunger of the syringe.

Example 23 may include the subject matter of Example 22, and may further specify that the force logic includes logic to rinse the plunger at a slow speed when the force is above a threshold.

Example 24 may include the subject matter of Example 22 or 23, and may further specify that the force logic includes logic to rinse the plunger multiple times when the force is above a threshold.

Example 25 may include the subject matter of any of Example 22-24, and may further specify that the force logic includes logic to notify a user to clean or replace the syringe when the force remains above a threshold.

Example 26 may include the subject matter of any of Example 15-25, and may further specify that the scientific instrument support apparatus further includes a removal logic to receive an input that the syringe will be removed and to rinse the syringe additional times in response to the input that the syringe will be removed.

Example 27 may include the subject matter of any of Example 15-26, and may further specify that the scientific instrument support apparatus further includes an install logic to receive an input that a new syringe is installed and to rinse the syringe at a slow speed with a low volatility solvent in response to the input that the new syringe is installed.

Example 28 may include the subject matter of Example 27, and may further specify that the input that the new syringe is installed is in response to automatically determining the new syringe is installed.

Example 29 may include the subject matter of any of Example 15-28, and may further specify that the solvent logic includes logic to provide a list of final rinse solvents based on the initial rinse solvent selection, wherein the list of final rinse solvents includes low volatility solvents that are miscible in the selected initial rinse solvent.

Example 30 may include the subject matter of any of Example 15-29, and may further specify that the solvent logic includes logic to provide a list of final rinse solvents based on the initial rinse solvent selection, wherein the list is provided in response to the initial rinse solvent selection including a volatile solvent.

Example 31 may include the subject matter of any of Example 15-30, and may further specify that the rinsing logic includes logic to retain a volume of the final rinse solvent in the barrel of the syringe between sample injections and to expel any remaining solvent from the syringe before drawing up a sample.

Example 32 includes any of the scientific instrument support modules disclosed herein.

Example 33 includes any of the methods disclosed herein.

Example 34 includes any of the GUIs disclosed herein.

Example 35 includes any of the scientific instrument support computing devices and systems disclosed herein.

The invention claimed is:

1. A scientific instrument support system, comprising:
an autosampler configured to use a syringe;
a computing device comprising:
a processing device; and
a storage device storing instructions that, when executed by the processing device, cause the processing device to:
determine a maximum time without wetting for the syringe; and
control the autosampler to rinse the syringe with a solvent when the maximum time without wetting is reached.

2. The scientific instrument support system of claim 1, wherein determining the maximum time without wetting comprises adjusting the maximum time as a function of one or more parameters including solvent volatility, temperature, needle length, needle internal bore size, barrel internal bore size, surface tension of the solvent, or any combination thereof.

3. The scientific instrument support system of claim 1, wherein controlling the autosampler comprises rinsing the syringe with a solvent when the time since last use of the syringe exceeds a threshold.

4. The scientific instrument support system of claim 1, wherein the instructions further cause the processing device to:
determine an amount of solvent remaining in a solvent container; and
prevent rinsing the syringe when the amount of solvent remaining is below a solvent-volume threshold.

5. The scientific instrument support system of claim 4, wherein the instructions further cause the processing device to generate an alert when the amount of solvent remaining is below a threshold.

6. The scientific instrument support system of claim 1, wherein the instructions further cause the processing device to monitor a force when moving a plunger of the syringe.

7. The scientific instrument support system of claim 6, wherein controlling the autosampler comprises rinsing the syringe at a reduced plunger speed when the monitored force exceeds a stored force threshold.

8. The scientific instrument support system of claim 6, wherein controlling the autosampler comprises rinsing the syringe multiple times when the force exceeds a stored force threshold.

9. The scientific instrument support system of claim 1, wherein controlling the autosampler comprises:
retaining a volume of a final rinse solvent in the syringe between injections; and
expelling any remaining solvent from the syringe before drawing up a sample for injection.

* * * * *